United States Patent
Zoltan

(10) Patent No.: US 7,343,231 B2
(45) Date of Patent: Mar. 11, 2008

(54) COMPUTERIZED SIMULTANEOUS LASER MARKING AND TARGETING SYSTEM

(75) Inventor: Filep Zoltan, 300 Wiley Ct., Turlock, CA (US) 95382

(73) Assignee: Filep Zoltan, Sunnyvale, CA (US)

( * ) Notice: Subject to any disclaimer, the term of this patent is extended or adjusted under 35 U.S.C. 154(b) by 0 days.

(21) Appl. No.: 11/641,184

(22) Filed: Dec. 18, 2006

(65) Prior Publication Data
US 2007/0094878 A1    May 3, 2007

(51) Int. Cl.
*G01D 1/00* (2006.01)

(52) U.S. Cl. .......................................... 701/23; 701/28
(58) Field of Classification Search .................. 33/18.1
See application file for complete search history.

(56) References Cited

U.S. PATENT DOCUMENTS

| | | | | |
|---|---|---|---|---|
| 4,333,008 A | * | 6/1982 | Misek | 250/225 |
| 4,773,018 A | * | 9/1988 | Lundstrom | 701/200 |
| 4,790,402 A | * | 12/1988 | Field et al. | 180/169 |
| 4,855,915 A | * | 8/1989 | Dallaire | 701/23 |
| 6,265,704 B1 | * | 7/2001 | Livingston | 250/203.2 |
| 6,275,773 B1 | * | 8/2001 | Lemelson et al. | 701/301 |
| 6,370,475 B1 | * | 4/2002 | Breed et al. | 701/301 |
| 6,629,028 B2 | * | 9/2003 | Paromtchik et al. | 701/23 |
| 6,809,307 B2 | * | 10/2004 | Byren et al. | 250/201.9 |
| 6,944,365 B2 | * | 9/2005 | Miller et al. | 385/18 |

* cited by examiner

*Primary Examiner*—Christopher W Fulton
(74) *Attorney, Agent, or Firm*—James E. Eakin

(57) ABSTRACT

The complete automation of a remote marking process. It is completely computer controlled and made possible by laser printer type marking/pointer equipment. The concept of embedding digital information into a laser beam or other coherent information vector and attaching this way data/information to any object or place. The using of a discrete information vector not only as a beacon but also as a selector for the marking of more than one target objects. Software controlled computerized digital marking of places or objects for closing motion control loops. No on-site human operators/soldiers needed. No position sensors needed anymore, nothing is bolted down, easy to reconfigure any environment. The invention is a major step in robotics and controls, improving considerably the eye-hand coordination of robots, making fully possible the action of the digital world on the real/physical world.

18 Claims, 5 Drawing Sheets

COMPUTERIZED SIMULTANEOUS LASER MARKING AND TARGETING SYSTEM

RELATED APPLICATIONS

This application for U.S. patent is a non-provisional conversion of U.S. provisional application for patent Ser. No. 60/525,809 filed on Nov. 28, 2003, and claims the benefit thereof.

BACKGROUND OF THE INVENTION

Marking is an important component in the processing of objects. Marking is actually communicating information and decisions to the processing units. Even for a temporary marking, like for a processing phase, labeling and scanning has been used. The method is restrictive, because the object has to be oriented all the time towards the scanners, otherwise the labels cannot be read. After a certain processing phase, the label may become obsolete, creating confusion. It needs additional equipment and time in the processing flow for this type of marking. Handling of large size objects makes the classical method of marking also too slow. Labels can be read one at a time, slowing down the parallel processing.

There are other fields, like in the military, where marking is also important—identifying the difference between target and neutral or even friendly object—but labeling is impossible. Classical laser targeting is sequential, one object after the other, where the targeting has to follow the target until processing completes, making parallel processing impossible.

Thus there is a need for parallel processing, for a higher efficiency, and preferably for a substantially simultaneous marking.

SUMMARY OF THE INVENTION

The invention is directed to increasing the efficiency of existing laser marking and targeting systems, helping also decision making and process control.

The simultaneous laser marking/targeting system (SLTS) scans the field and simultaneously target multiple objects—indifferent to their physical orientation, subjects of future processing—with a coded laser, such that each object is receiving and reflecting specific information. The reflected information is read and used by one or more processing units to locate, to select, to approach and to process in the same time the selected objects. The marking and targeting system is controlled by at least one computer.

A human operator can select the targets thru a human-machine interface (HMI), 'by mouse-click'. The presence of a human operator is optional. Decision making can be aided by image recognition software working together with at least one database. This can reduce the risk of human error, avoiding wrongful processing like friendly fire or civilian casualties.

The differences from the classical "point the target" procedure to the simultaneous targeting are like from the sequential search of information on magnetic bands to the direct memory access on hard-drives, the advantages are undeniable.

DETAILED DESCRIPTION OF THE INVENTION

Figure 1:
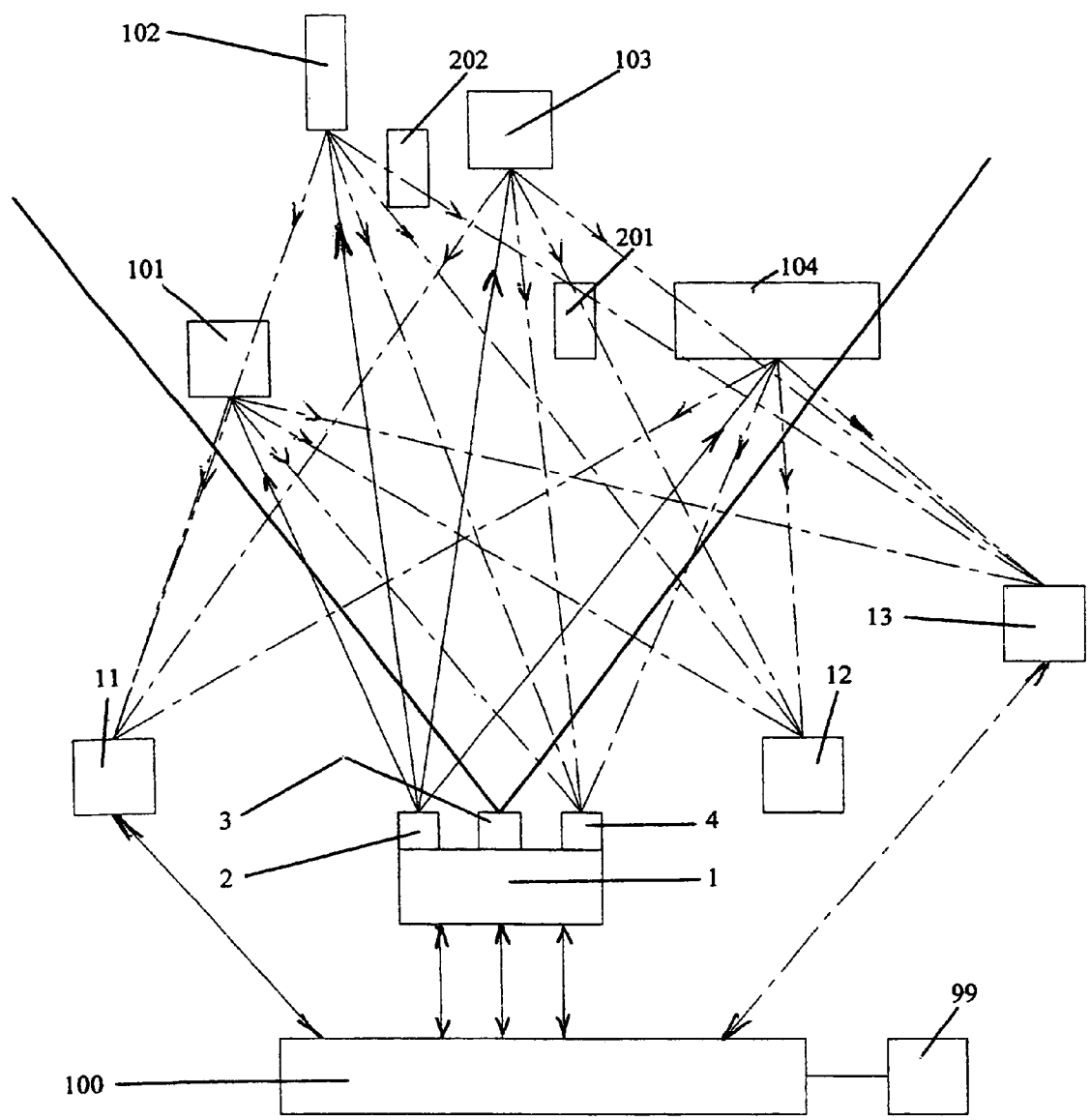
FIG. 1 is a general view of the application of the invention.

In all drawings:
1 Simultaneous Laser Targeting equipment (SLT)
2 Simultaneous Laser Targeting Unit (SLTU)
3 Video Camera (VC)
4 Laser Control Camera (LCC)
11, 12, 13—Processing Units (PU)
101, 102, 103, 104—Target Objects (TO)
201, 202—Neutral Objects (NO)
100—Computer
99—Human Machine Interface (HMI)
501—SLTU Controller
511—Laser
512—Laser Control Unit
521—Rotating Mirror
522—Horizontal Servo Motor
523—Vertical Servo Motor
601, 602, 603, 604—Guiding Sensors
605—Selector Sensor FIG. 1 is a general view of the application of the invention as a targeting system. From a multitude of objects, 101-104 are selected as target. The rest of the objects—201 and 202—are considered neutral and are not targeted. Targeting is executed by 1, the SLT. The simultaneous laser targeting equipment 1 (SLT) has as components the simultaneous laser targeting unit 2 (SLTU), the video camera 3 (VC) and the laser control camera 4 (LCC).

The video camera 3 (VC) is observing the field and is delivering the input to the system. The information given by 3 is processed by 100—computer with an image recognition software and database, or a human operator 99, selecting the targets and the procedure to apply. The targets are marked by the simultaneous laser targeting unit 2 (SLTU) and discrete information is sent via the laser to each target. The laser control camera 4 is reading the reflected targeting information, helping making the adjustments and corrections if necessary. It is actually closing the control loop for targeting.

The reflected laser beam's coded information is read by the processing units 11, 12 and 13. These units can be simply pre-programmed, like 12, or they can have a communication to the computer 100 or other computers, being hard-wired like 11 or wireless like 13. The processing units having a SMART-type of guiding system, they can use the reflected signals as a beacon, selecting their own targets and applying the required processing to them, in accordance to the laser beam's decoded information and controls.

Figure 2:
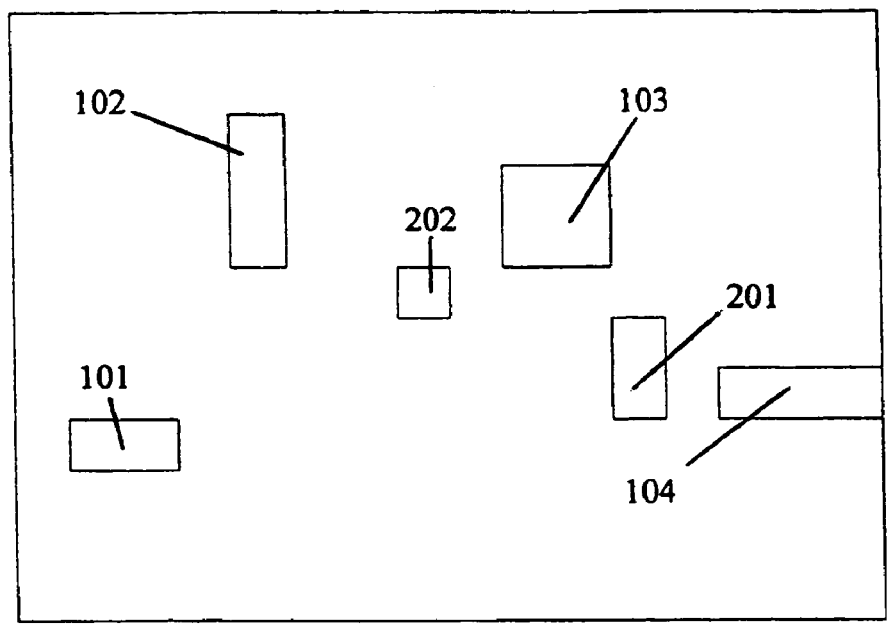
FIG. 2 is an image of the processing area, with subjects of processing and neutral objects.

FIG. 2 is an image of the processing area with the marked objects 101, 102, 103, 104 and the neutral objects 201, 202. It is the image captured by the video camera 3, the input for the targeting system.

Figure 3:
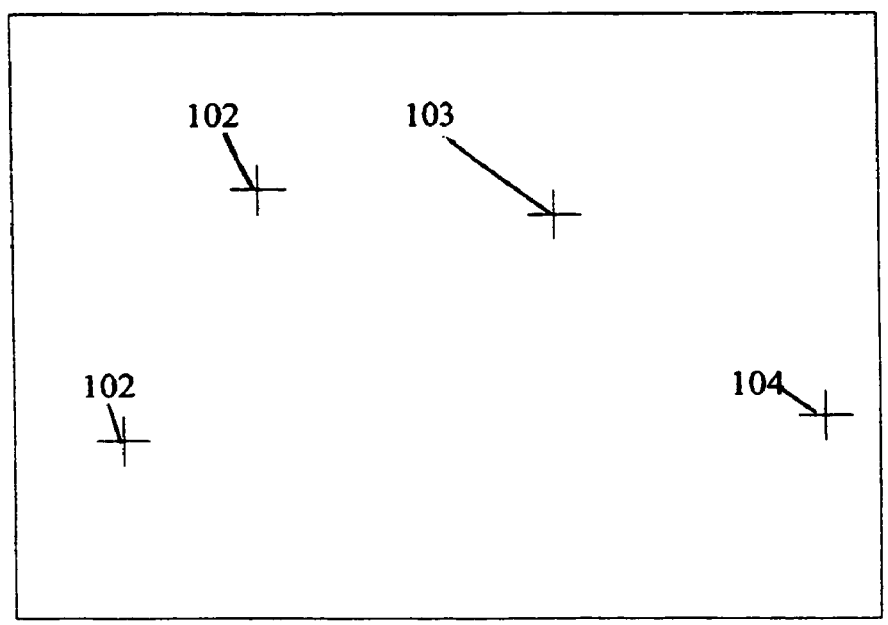
FIG. 3 is an image of the laser control camera, with multiple applied marks/labels.

FIG. 3 is the image captured by the laser control camera 4, the actual feed-back.

Figure 4:
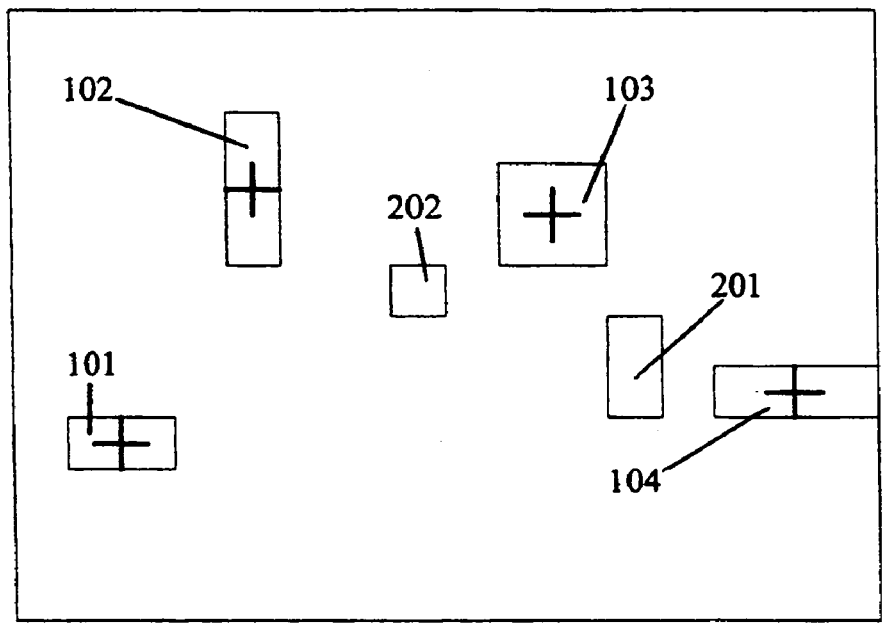
FIG. 4 is a combined picture of FIG. 2 and FIG. 3, showing the marked/targeted objects and the neutral objects together. This is the image displayed on the HMI.

FIG. 4 is the combined image of the VC and LCC, actually displayed on the HMI display 99. This is what the human operator sees on his display.

Figure 5:
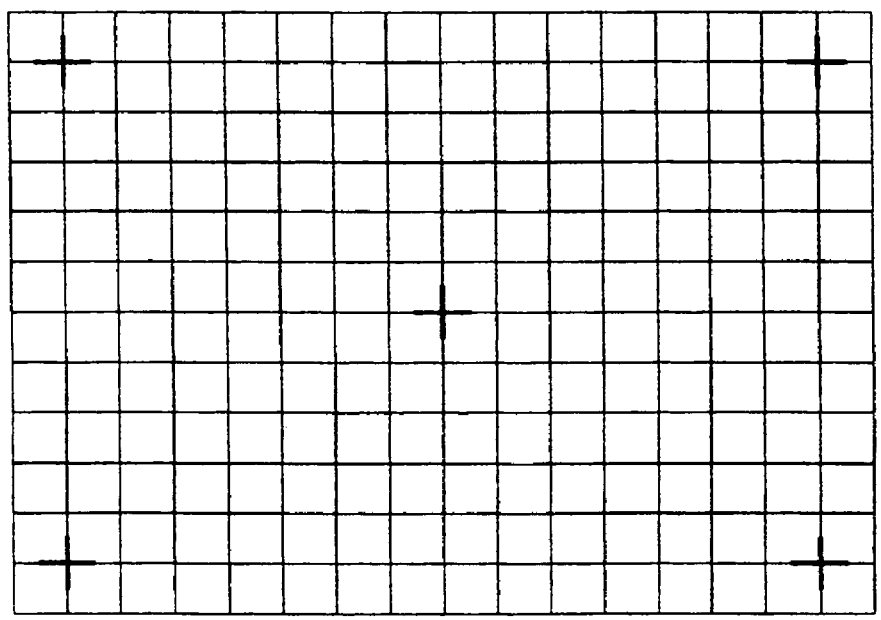
FIG. 5 is a calibration raster for the SLTS.

FIG. 5 is a calibration raster to align the SLTU, VC and LCC. The idea is similar to the aligning of touch-screens. Corrections are made in the controls, until the 4 corners and the center of all 3 images—video 3, marking 2 and feedback 4—are perfectly aligned.

Figure 6:
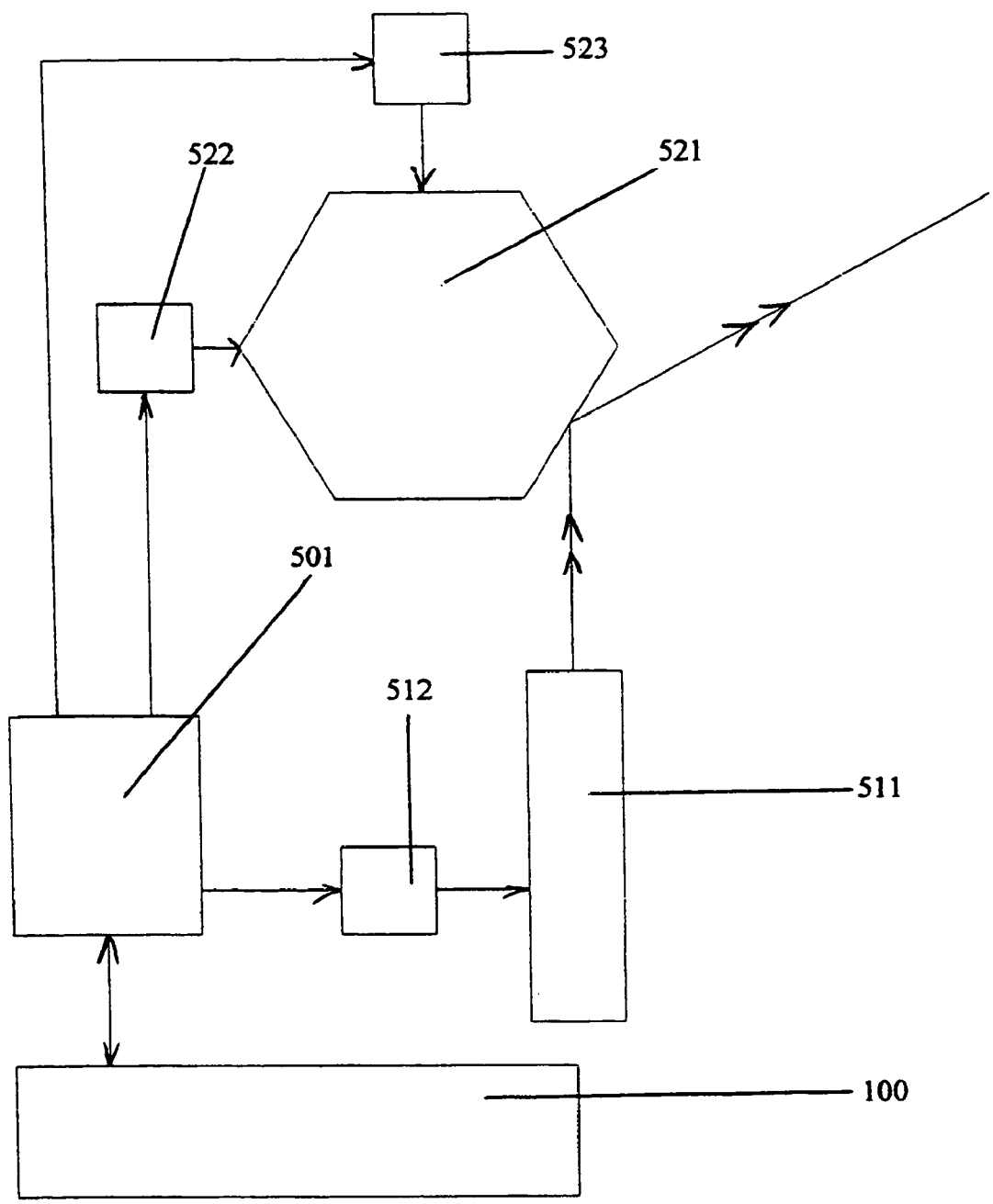
FIG. 6 is a representation of the working principle of the simultaneous laser targeting unit (SLTU).

FIG. 6 is a representation of the working principle of 2, the SLTU. It is similar to the working principle of laser-printers, but it is using a different type of laser—one compatible with smart guiding systems—and the laser is oriented towards external targets.

The laser is not used to discharge an electro-statically charged film, it is transmitting and projecting an information package to the targets. The SLTU controller 501 is receiving the targeting information from the computer 100. It is controlling the elevation and azimuth of the laser beam by tilting and rotating the mirror 521 with the help of the vertical and horizontal servo-motors 523 and 522. The laser beam doesn't have to scan pixel by pixel the whole visual field, like a full page in printing, it can be oriented directly to the coordinates, one target after the other, repeatedly. Being no need for a full scan, it is possible to achieve a high repetition rate, making the marking virtually simultaneous.

The 501 is sending the coded information to the laser control unit 512, which is commanding the laser gun 511.

Figure 7:
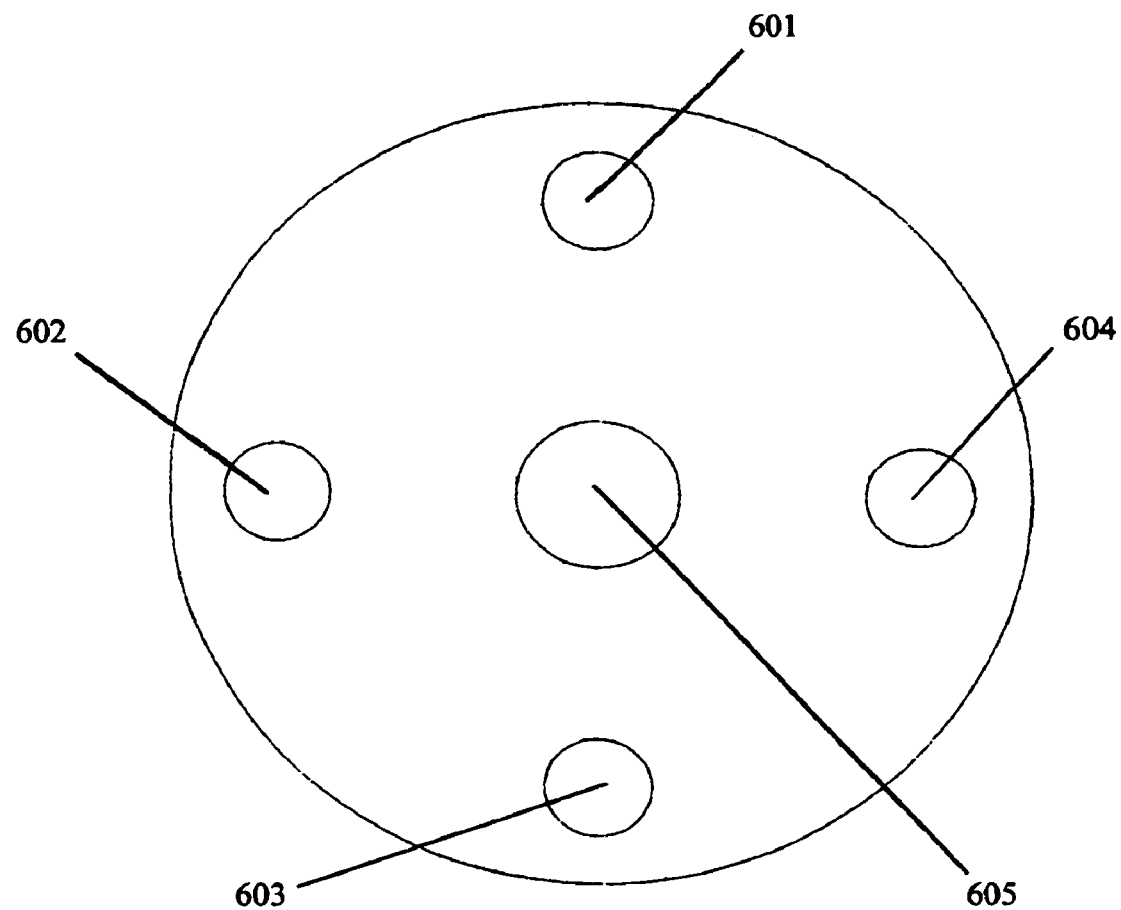
FIG. 7 is a representation of the sensor array of a processing unit.

FIG. 7 is a representation of the sensor array of a processing unit. The processing unit is reading the reflected information with the selector sensor 605. If it is match, it is aligning himself on the target and it is approaching it using the guide sensors 601, 602, 603 and 604. Otherwise, if there is no match, the processing unit is searching for an other target, until it finds its own.

As military applications, there are all the targeting systems, which can be improved considerably, from UAVs and the anti-tank systems to the ICBM defense, so called anti-rocket rocket systems, the 'Star War' defense system.

This type of marking can be used in non military purposes too, like in a robotic production environment, internet surgery, unmanned vehicles or a multiple axis CNC machine.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

I claim:

1. A method for substantially simultaneously marking and guiding for processing of one or more targeted objects, comprising optically encoding information into a beam emitted from a laser source, projecting the encoded information onto the surface of at least one of the targeted objects, using the encoded information, when reflected off the objects, for guidance and as a selector to differentiate and identify the targeted objects by one or more processing units.

2. The method for substantially simultaneously marking and guiding for processing of claim 1, wherein the beam is a coherent information carrier being focused and convergent on a surface of at least one of the targeted object(s).

3. The method for substantially simultaneously marking and guiding for processing of claim 1, wherein the beam carries discrete information to at least one of the targeted objects.

4. The method for substantially simultaneously marking and guiding for processing of claim 1, wherein said discrete information is reflected by said targeted objects, marking the said targeted objects by associating said discrete information with each of them.

5. The method for substantially simultaneously marking and guiding for processing of claim 1, wherein said reflected information is used as a beacon for guidance by said processing units.

6. The method for substantially simultaneously marking and guiding for processing of claim 1, wherein said reflected discrete information is read and decoded by the processing unit.

7. The method for substantially simultaneously marking and guiding for processing of claim 1, wherein said reflected discrete information is used as a selector to identify and select the targeted object by the processing unit.

8. The method for substantially simultaneously marking and guiding for processing of claim 1, wherein said discrete information contains at least one identification code and at least one processing code.

9. The method for substantially simultaneously marking and guiding for processing of claim 1, further comprising the steps of repeatedly scanning at high speed a processing zone and repeatedly marking the targeted objects making the marking substantially simultaneous.

10. A system for substantially simultaneously marking and guiding for processing of one or more targeted objects comprising: a simultaneous marking means comprising a computer and process control means for command and control of marking and processing units, an input means having a human-machine interface for manual target and procedure selection, and an input-output means comprising substantially simultaneous discrete targeting equipment including a laser beam having encoded therein target-specific information for the marking of the targeted objects; a discrete guiding means comprising a discrete decoder means, for reading and decoding discrete information reflected by the target and selection of the target by the processing unit, and a guiding means for guiding units directed by the processing unit towards the selected target.

11. The system for substantially simultaneously marking and guiding for processing of one or more targeted objects of claim 10, wherein said computer and process control is processing information received from at least one of a group comprising a digital video camera, a human-machine interface, and an image recognition software in combination with at least one database.

12. The system for substantially simultaneously marking and guiding for processing of one or more targeted objects of claim 10, wherein said computer and process control is controlling the substantially simultaneous discrete targeting equipment and said processing units according to inputs and processed data.

13. The system for substantially simultaneously marking and guiding for processing of one or more targeted objects of claim 10, wherein said discrete guiding system uses reflected discrete information as a beacon for orientation and as a selector for identification of the targeted object.

14. The system for substantially simultaneously marking and guiding for processing of one or more targeted objects of claim 10, wherein the targeting equipment uses a coded laser beam as a discrete information vector, and repeatedly projects the coded laser beam on the surfaces of the targeted objects.

15. The system for substantially simultaneously marking and guiding for processing of one or more targeted objects of claim 10, wherein said coded laser beam is deflected from the surface of a mirror in motion to scan a predetermined area.

16. The system for substantially simultaneously marking and guiding for processing of one or more targeted objects of claim 10, wherein a calibration raster is used to align the cameras and the targeting equipment.

17. The system for substantially simultaneously marking and guiding for processing of one or more targeted objects of claim 10, wherein a laser control unit encodes data into the laser beam by digitizing the laser beam.

18. The system for substantially simultaneously marking and guiding for processing of one or more targeted objects of claim 10, wherein the substantially simultaneous effect is achieved by repeated high speed marking.

* * * * *